(12) United States Patent
Brinkhuis et al.

(10) Patent No.: US 10,017,607 B2
(45) Date of Patent: Jul. 10, 2018

(54) COMPOSITION CROSSLINKABLE BY REAL MICHAEL ADDITION (RMA) REACTION

(71) Applicant: ALLNEX NETHERLANDS B.V., Bergen op Zoom (NL)

(72) Inventors: Richard Hendrikus Gerrit Brinkhuis, Zwolle (NL); Ferry Ludovicus Thys, Stevens-Woluwe (BE); Elwin Aloysius Cornelius Adrianus De Wolf, Hoogerheide (NL)

(73) Assignee: Allnex Netherlands B.V., Amsterdam (NL)

( * ) Notice: Subject to any disclaimer, the term of this patent is extended or adjusted under 35 U.S.C. 154(b) by 0 days.

(21) Appl. No.: 14/781,600

(22) PCT Filed: Apr. 7, 2014

(86) PCT No.: PCT/EP2014/056953
§ 371 (c)(1),
(2) Date: Oct. 1, 2015

(87) PCT Pub. No.: WO2014/166880
PCT Pub. Date: Oct. 16, 2014

(65) Prior Publication Data
US 2016/0060389 A1    Mar. 3, 2016

(30) Foreign Application Priority Data

Apr. 8, 2013 (EP) .................................... 13162819

(51) Int. Cl.
| | | |
|---|---|---|
| *C08G 63/91* | (2006.01) | |
| *C09D 167/02* | (2006.01) | |
| *C08J 3/24* | (2006.01) | |
| *C08G 63/181* | (2006.01) | |
| *C08K 3/013* | (2018.01) | |

(52) U.S. Cl.
CPC ......... *C08G 63/916* (2013.01); *C08G 63/181* (2013.01); *C08J 3/24* (2013.01); *C08K 3/013* (2018.01); *C09D 167/02* (2013.01); *C08G 63/91* (2013.01); *C08J 2367/00* (2013.01)

(58) Field of Classification Search
CPC .................................................... C08G 63/91
See application file for complete search history.

(56) References Cited

U.S. PATENT DOCUMENTS

| | | | |
|---|---|---|---|
| 6,878,845 | B2 | 4/2005 | Sheridan |
| 8,962,725 | B2 | 2/2015 | Brinkhuis et al. |
| 9,181,452 | B2 | 11/2015 | Brinkhuis et al. |
| 9,181,453 | B2 | 11/2015 | Brinkhuis et al. |
| 9,534,081 | B2 | 1/2017 | Brinkhuis et al. |
| 2011/0251338 | A1 | 10/2011 | Kim et al. |

FOREIGN PATENT DOCUMENTS

| | | | | |
|---|---|---|---|---|
| CN | 1723242 | A | 1/2006 | |
| CN | 1757656 | A | 4/2006 | |
| CN | 102834436 | A | 12/2012 | |
| CN | 102834437 | A | 12/2012 | |
| EP | 0808860 | A2 | 11/1997 | |
| EP | 1593727 | B1 | 8/2008 | |
| EP | 2374836 | A1 | 10/2011 | |
| WO | 2008/157468 | A1 | 12/2008 | |
| WO | 2011/124663 | A1 | 10/2011 | |
| WO | 2011/124664 | A1 | 10/2011 | |
| WO | 2011/124665 | A1 | 10/2011 | |
| WO | WO 2011124664 | A1 * | 10/2011 | ............. C08K 5/098 |
| WO | 2013/050622 | A1 | 4/2013 | |
| WO | 2013/050623 | A1 | 4/2013 | |

OTHER PUBLICATIONS

Priority Search Report for European Patent Application No. 13162819.0 dated Feb. 19, 2014.
International Search Report for PCT/EP2014/056953 dated May 2, 2014.
International Preliminary Report on Patentability for PCT/EP2014/056953 dated Oct. 13, 2015.
T. Jung et al., Farbe and Lacke, Oct. 2003.

\* cited by examiner

*Primary Examiner* — Michael Pepitone
(74) *Attorney, Agent, or Firm* — Ramin Amirsehhi; Hoyng Rokh Monegier LLP

(57) ABSTRACT

The present invention relates to a crosslinkable composition crosslinkable by Real Michael Addition (RMA) reaction comprising a component with at least 2 activated unsaturated groups (hereafter referred to as the RMA acceptor groups) and a component with at least 2 acidic protons C—H in activated methylene or methane groups (hereafter referred to as the RMA donor groups) which components can react to form a crosslinked network.

23 Claims, No Drawings

COMPOSITION CROSSLINKABLE BY REAL MICHAEL ADDITION (RMA) REACTION

CROSS REFERENCE TO RELATED APPLICATION

This application is a 35 U.S.C. 371 National Phase Entry Application from PCT/EP2014/056953, filed Apr. 7, 2014, which claims the benefit of European Patent Application No. 13162819.0, filed on Apr. 8, 2013, the disclosure of which is incorporated herein in its entirety by reference.

The present invention relates to a crosslinkable composition crosslinkable by Real Michael Addition (RMA) reaction comprising a component with at least 2 activated unsaturated groups (hereafter referred to as the RMA acceptor groups) and a component with at least 2 acidic protons C—H in activated methylene or methine groups (hereafter referred to as the RMA donor groups) which components can react to form a crosslinked network.

RMA chemistry can be tuned to give fast curing compositions, also at lower curing temperatures, in compositions at acceptable or good pot lives, to achieve good material properties, which makes this chemistry very attractive as a basis for crosslinkable compositions. Details of RMA crosslinkable compositions using a latent base crosslinkable catalyst are described in WO2011/124663.

Real Michael addition is activated by strong bases, but also inhibited by the presence of acidic species that will consume these basic catalysts. In tuning the reactivity of coating systems in view of achieving a desirable drying profile, there are various requirements to balance. The drying profile (also referred to as the reaction profile or as the curing profile) is the progress of the crosslinkable reaction as a function of time. Generally, it is required that the drying profile allows build-up of mechanical properties as fast as possible, under mild conditions, to help the productivity. The crosslinkable composition also requires a reasonable time in which it can be used with good application properties, following its formulation, for it to be practical; this time is generally referred to as the pot life. It is further also required to have a drying profile that is robust, i.e. the reactivity (and hence the resulting drying profile) is not strongly influenced by accidental low levels of acidic contaminants being present.

On the other hand, for coating applications, it is required to have a good appearance of the resulting coating. This implies the need for sufficient levelling during the immediate period after application, when the curing coating composition is present as a liquid and capable of such levelling. This also implies the need for absence of artefacts like solvent inclusions or gas inclusions or other surface irregularities that may occur if curing is very fast, especially if it is faster at the surface than in deeper layers, which is often the case if curing occurs at the time scale of solvent evaporation or surface activation of a catalyst. Also film hardness build-up will be affected under conditions in which solvent entrapment occurs.

The described requirements are to some extent opposing each other. For a fast curing profile, but also for a high robustness against accidental acid contaminants reasonably high levels of catalyst are preferred, whereas at the same time such high levels of catalysts may create a too rapid cure, and negatively influence surface appearance and hardness development as described above. In general, higher catalyst levels may also negatively affect the pot life.

It has been shown in previous publications WO2011/124663, WO2011/124664, and WO2011/124665 that it is possible to combine fast curing with a long pot life, by using carbon dioxide blocked basic catalyst, that become active upon evaporation of carbon dioxide ($CO_2$) when the composition is applied as thin film. Whereas this method is useful in creating long pot life/fast cure combinations, it introduces complications in the case of thick films applications, where there is a risk of inhomogeneous activation resulting from $CO_2$ escaping from the surface. Moreover, for applications in which there is no large surface available for allowing $CO_2$ to evaporate, such $CO_2$ blocked catalysts have significant limitations.

There is also a desire for crosslinkable compositions that can be simply cured in ambient conditions as opposed to for example compositions comprising photo-latent amine catalysts, known from T. Jung et al Farbe and Lacke October 2003. Such photo-latent amine catalysts that do generate a strong base on UV radiation, are not suitable for coating more complex irregular substrates where parts of the surfaces are not reachable with UV or visible light, or for highly pigmented systems.

The object of the invention is to provide an RMA crosslinkable composition that provides a better balance in these counteracting requirements.

According to the invention at least one of the aforementioned problems has been overcome by a crosslinkable composition crosslinkable by Real Michael Addition (RMA) reaction comprising
 a. Component(s) A having at least 2 acidic C—H donor groups in activated methylene or methine and having a $pKa(A)$ between 10.5 and 14,
 b. Component(s) B having at least 2 activated unsaturated acceptor groups, wherein a molar ratio R of acceptor groups to donor groups is between 3:1 to 1:6 and which component(s) B reacts with component(s) A by Real Michael Addition (RMA) to form a crosslinked network,
 c. basic component(s) C being a salt of a basic anion X— from an acidic X—H group containing compound wherein X is N, P, O, S or C,
  i. In an amount xc between 0.001 and 1 meq/(gr of components A, B, C, D),
  ii. anion X— being a Michael Addition donor reactable with component B and
  iii. anion X— is characterized by a $pKa(C)$ of the corresponding acid X—H of more than two units lower than the $pKa(A)$ of the majority component A and being lower than 10.5,
 d. optional component(s) D comprising one or more acidic X'—H groups wherein X' is N, P, O, S or C,
  i. X' being a same or different group as group X in component C,
  ii. the X'-anion being a Michael Addition donor reactable with component B,
  iii. the $pKa(D)$ of the X'—H group in component D being more than two units lower than $pKa(A)$ of the majority component A and being lower than 10.5,
  iv. the equivalent ratio Rd/c of acidic X'—H groups in component D over basic anion X— in component C is between 1% and 5000%,
 e. not including a composition comprising an ethylmalonate modified polyester based on neopentyl glycol and hexahydrophthalic anhydride, di-trimethylolpropane-tetraacrylate and tetrabutylammonium succinimide and ethylacetoacetate.

The inventors have found that it is possible to initiate an effective cross-linking reaction between RMA donor and acceptor components A and B using the specified component C being a salt of a cation and a basic anion X— from a (deprotonated) acidic X—H group containing compound wherein X is N, P, O, S or C and wherein anion X— also is a Michael Addition donor reactable with component B and with specific requirements for the pKa(C) of the corresponding X—H. The specified anion X— of component C initiates the RMA reaction and anion X— will be covalently linked to component A and become integrated into the cross-linked network being formed, which is advantageous in view of the mechanical and chemical properties of the resulting cross-linked product. The term acidic X—H group containing compound wherein X is N, P, O, S or C means a compound comprising an X—H acidic group wherein the acidic proton H is situated on a N, P, O, S or C atom in that compound. Although the X here refers to an atom in the compound, where in the description or claims reference is made to X—H group, anion X—, group X— etc it of course refers to the compound containing the acidic X—H or deprotonated X— group. This similarly applies to X' and X".

Whether or not a component is a Michael Addition donor reactable with component B depends on the pKa values as specified, but also on certain molecular parameters. Michael Addition donors are known in literature and it can easily be established by the skilled person by a simple experiment whether or not a component exhibits Michael addition reactivity towards component B. Such experiment is also described below. Suitable X—H group containing components with their pKa values are also described below. Each component A, C, D, and F in the composition is identified by a characteristic range of pKa. The pKa values of both existing compounds are reported in literature and/or can easily be established by standard routine by the skilled person. In this context, where a component comprises more than one acidic proton, the relevant pKa of said component is the pKa of the first proton of the component; for example pKa(A) from malonate is 13. Further, when referring to the pKa of a component it is implied that reference is made to the pKa of the X—H acidic RMA donor group in that component. It is noted that the term component(s) means one or more components, which includes also two or more different components.

The composition according to the invention provides a well-balanced set of application properties as application time drying time, hardness development without solvent entrapment complications and appearance. The initiation of the RMA reaction does not require a separate base catalyst. In particular, the RMA reaction for the composition of the invention does not require a carbon dioxide blocked base catalyst and therefore it has advantages in applications like composites, adhesives etc where carbon dioxide evaporation is problematic or impossible. Apart from that, the composition can be significantly less expensive compared to compositions having a latent base catalyst. One aspect of that lower price is the wider choice of cations that can be used in the salt component C, including less-expensive cations like alkaline or alkaline earth metal cations, due to a better solubility of the salt of most anions X— compared to a carbonate anion. Yet another advantage of the present invention is that the component C is less sensitive to inhibition of RMA reaction by a hydroxyl groups containing polymer. Therefore, the salt component C can be used in combination with one or more A, B, D and/or F containing hydroxy functional polymers having a hydroxy value of more than 61 mgr KOH/gr and up to 200, 180, 150, 120 100 or 80 mgr KOH/gr, whilst still having good appearance and hardening properties.

Disclaimed from the above composition is a composition comprising an ethylmalonate modified polyester based on neopentyl glycol and hexahydrophthalic anhydride, di-trimethylolpropane-tetraacrylate, tetrabutylammonium succinimide and ethylacetoacetate. Alternatively, the above composition does not include tetrabutylammonium succinimide as component C in combination with ethylacetoacetate. Alternatively, the composition does not comprise tetrabutylammonium succinimide as component C.

In a preferred embodiment, the crosslinkable composition comprises component(s) D comprising one or more acidic X'—H groups wherein X' is N, P, O, S or C,
i. X' being a same or different group as group X in component C,
ii. the X'-anion being a Michael Addition donor reactable with component B,
iii. the pKa(D) of the X'—H group in component D being more than two units lower than the pKa(A) of the majority component A and being lower than 10.5,
iv. the equivalent ratio Rd/c of acidic X'—H groups in component D over basic anion X— in component C is between 1 and 5000%.

It was surprisingly found that the presence of component D in the inventive composition creates a drying profile with an induction time, implying that crosslinking reactivity starts off low (allowing pot life, flow and escape of optional solvent), while still benefiting from the full potential of the initiator component C beyond this induction time, thus creating an acceleration of the reaction at later stages to complete crosslinking at high rate. This induction time can be tuned through the amounts and characteristics of components C and D as will be explained in more detail below.

Component D is optional, so the amount range is between 0% and 5000%. Preferably, component D is present and the equivalent ratio Rd/c of acidic X'—H groups in component D over basic anion X— in component C is between 10 and 4000%, more preferably between 20 and 2000%, most preferably between 50 and 500%, 400% or 300% or between 75 and 200%.

Without wishing to be bound by theory it is believed that the reaction mechanism in essence is that anion X— in component C reacts with B forming the deprotonated X—B— carbanion adduct, which on turn deprotonates X'—H groups in component D (the next strongest acid available) to form anion X'— which on turn reacts with B to form adduct X'—B— until the amount of D has been depleted and only then the strong base X'—B— adduct will react with A (which reacts later than D because A is less acidic and has a higher pKa). The latest reaction in the reaction chain is the reaction causing the components A en B to crosslink to form a network. However, the time consuming reaction is the reaction between anion X— and X'— with B to form adduct X—B— and X'—B— because the reactivity of anion X— and X'— towards B is low, which creates the induction time.

Yet another advantage of the present invention compared to the prior art CO2 blocked latent base catalyst is that the lower limit of the pKa of the components in the composition can be much lower because there is no risk of acid decomposition of the CO2 blocked catalyst. The pKa(C) and pKa(D) can be very low. The pKa(C) and pKa(D) can be as low as −2, −1, 0 but preferably are at least 1, 2 or 3 in view of achieving sufficient Michael addition reactivity. Because of this wide pKa range the component C and D can be chosen from a relatively wide range of molecules.

The initiation of the RMA reaction is caused by components C. The composition according to the invention does not need any further basic components to initiate the RMA reaction. Therefore, it is preferred that the composition comprises less than 50 mole %, and most preferably substantially no (i.e. 0 mole %) of another basic compound other than C that can initiate or catalyse the RMA crosslinking reaction. Preferably, the composition comprises less than 50, 40, 30, 20, 15, 10, 5, 3 mole % relative to basic components C of a basic component other than C that is able to initiate (directly of after deblocking or activation) the RMA reaction between A and B. In particular, it is an advantage of the present advantage that the composition comprises substantially no latent base catalyst, more in particular substantially no carbondioxide blocked latent base catalyst. This allows application in thicker layers or articles. An other base, for example an amine, can be present as long as it is so weak a base that it will not initiate RMA reaction.

In the component(s) A, the acidic C—H donor groups in activated methylene or methine having a pKa(A) between 10.5 and 14 and preferably have a structure according to formula 1:

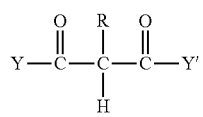

Formula 1 wherein R is hydrogen or an alkyl, aralkyl or aryl substituent and Y and Y' are same or different substituent groups, preferably alkyl, aralkyl or aryl (R*), or alkoxy (—OR*) or wherein the —C(=O)—Y and/or —C(=O)—Y' is replaced by CN or phenyl. The activated methylene or methine is the —(H—)C(—R)— group between the carbonyl groups in Formula 1. Preferably the RMA donor groups of component A are from malonate or acetoacetate groups and preferably they are dominantly from malonate groups. As these components can be build into a polymer for example trough transesterification, the ester group therein can be an ester link with a polymer.

In the crosslinkable composition it is preferred that the majority, preferably at least 50, 60, 70, or even 80 mole % of the C—H acidic RMA donor groups in component(s) A are from malonate or acetoacetate groups, more preferably malonate groups. In this case the malonate or acetoacetate groups are referred to as the dominant component A. The term dominant refers to the compound providing the majority of the functional RMA reactive donor or acceptor groups; in case of component A, C, D and F the type of X—H containing donor group providing the majority of the X—H acidic RMA donor groups. In the crosslinkable composition the majority, preferably at least 50, 60, 70 or even 80 mole % of the C—H acidic RMA donor groups in component(s) A are from malonate groups with the remaining RMA donor groups in component(s) A being substantially only from acetoacetate groups.

Components A containing both malonate and acetoacetate groups in the same molecule are also suitable. Additionally, physical mixtures of malonate and acetoacetate group-containing components are suitable. For example, components A could be a physical mixture of a polymer comprising malonate and single acetoacetate molecules. Especially preferred malonate group-containing components for use with the present invention are the malonate group-containing oligomeric or polymeric esters, ethers, urethanes and epoxy esters containing 1-50, more preferably 2-10, malonate groups per molecule. In practice polyesters and polyurethanes are preferred. It is also preferred that such malonate group-containing components have a number average molecular weight (Mn) in the range of from about 100 to about 5000, more preferably, 250-2500, and an acid number of about 2 or preferably less. Also monomalonates can be used as they have 2 reactive C—H per molecule. Monomeric malonates can, in addition, be used as reactive diluents.

Components B generally can be ethylenically unsaturated components in which the carbon-carbon double bond is activated by an electron-withdrawing group, e.g. a carbonyl group in the alpha-position. Suitable components B are known in the art, for example (meth-)acryloyl esters, (meth-) acrylamides, alternatively polyesters based upon maleic, fumaric and/or itaconic acid (and maleic and itaconic anhydride and polyesters, polyurethanes, polyethers and/or alkyd resins containing pendant activated unsaturated groups. Acrylates, fumarates and maleates are preferred. Most preferably, the dominant component B, preferably providing at least 50, 60, 70, 80 or even at least 90 mol % of the RMA acceptor groups, is an unsaturated acryloyl functional component. Preferably the functionality, defined as the number average number of unsaturated RMA acceptor groups per molecule component B, is 2-20, the equivalent weight (EQW: average molecular weight per reactive functional group) is 100-2000, and the number average molecular weight preferably is Mn 200-5000.

The amounts of components A and B are to be balanced in terms of their reactive equivalents for an RMA reaction. The equivalent molar ratio of C—H acceptor to donor groups in the composition is generally between 3:1 and 1:6, preferably between 2:1 and 1:4, more preferably between 3:2 and 1:3, most preferably less than 1:1 and preferably more than 1:2. Component A is typically present in the composition in weight fractions between 5 and 95 wt % (relative to total resin solids), component B is also typically present in the composition in weight fractions between 5 and 95 wt %. In the situation that A and B are present in the same polymer, the weight fraction of this polymer in the composition can be at least 80, 90 or 95 wt % and can even go up to 99 wt %.

Typically, at least one of the components A and B are in the form of a polymer, for example, a polyester containing malonate groups. It is also possible that both functional groups (associated with components A and B) can be present in the same polymer. It is noted that the term components A, B, C, D and F refers to the compound having the specified RMA reactive groups without specific regards to the molecular architecture. A component can be a small single molecule, a dimer, trimer or tetramer etc or a oligomer or a polymer chain to which one or more of the specified RMA reactive groups are attached. For example, Component A can be a single molecule with a single activated methylene moieties like malonate or ethylacetoacetate. These molecules have two acidic C—H donor groups available for RMA reaction. Component A can also be a dimer or trimer comprising 2 or 3 malonates. Component A can also be an oligomer or polymer chain comprising one or more malonates, for example attached to or incorporated in the chain. The same applies in fact to components B, C, D and F. Moreover, one or more of the components A, B, C, D and F can be combined in a small molecule, oligomer or polymer. The particular choice of the form of the components depends on the envisaged characteristics of the cross-linked network to be formed. Also different polymers can be used in combination in the composition, for example a polyester, polyepoxy, polyurethane or polyacrylate polymer. It is also envisaged to use combinations of different polymers which are integrated by the RMA reaction in the cross-linked network. It is noted that components C, D and F may also comprise two or more acidic donor groups that are Michael addition donor reactable with component B and therefore can be integrated into the cross-linked network. In general the molecular weight of the oligomer or polymers carrying components A to F can vary between wide ranges, the choice depending on the particular application envisaged; typically the (weight averaged) molecule weight Mw is higher than 100, 200 or 500 and lower than 200,000, 150,000 100,000 or 50,000 gr/mol. As described herein for coating applications the number average molecular weight (Mn) is preferably in the range of from about 100 to about 5000.

Preferably, the composition does not comprise substantial amounts of acidic components other than components A, C, D and F that are able to inhibit Michael Addition reaction between components A and B.

Component C is a salt according to formula $Cat^+$ $X^-$, wherein $Cat^+$ is a non-acidic cation, with no ability to inhibit the crosslinking reaction of components A and B. This implies that, if any protons are associated with the cation, their acidity does not exceed that of the dominant C—H functions in component A, by more than two units, preferably not more than 1 and more preferably not more than 0.5 pKa unit. Examples of useful cations include inorganic cations, preferably alkaline or alkaline earth metal cations, more preferably K+, Na+ and Li+, or organic cations like tetraalkylammonium and tetraalkylphosphonium salts, but also cations that do have a proton but are extremely non-acidic, for example protonated species of strongly basic organic bases as e.g. DBU, DBN or tetramethylguanidine. These bases would be able to initiate the crosslinking reaction between components A and B but do not interfere with the reaction (inhibiting) in their protonated form. An additional advantage of the invention is that component C can be significantly less expensive than the known RMA latent base catalyst. For example, in most circumstances the cations that are required in carbondioxide blocked latent base catalyst are of the tetraalkylammonium type which are much more expensive. Because of the anion X— the salt component C has sufficient solubility even with simple and inexpensive cations like potassium.

Basic component(s) C is a salt of a basic anion X— from an acidic X—H group containing compound wherein X is N, P, O, S or C. The anion X— of component C is essential for the invention. The anion X— must be a Michael Addition donor reactable with component B and it is an anion of a corresponding acid X—H that is significantly more acidic than the dominant reactive C—H species of component A. In particular, the anion X— is characterized by a pKa(C) of the corresponding acid X—H of more than two units lower than the pKa(A) of the majority component A and being lower than 10.5. If, for example, that dominant component A species is a malonate (pKa 13), the pKa of X—H should be lower than 10.5. Preferably, it is lower than 10, more preferable lower than 9.5, even more preferably lower than 9, most preferably lower than 8.5. If the dominant C—H species of component A is of another nature (e.g. acetoacetate, pKa 10.7), the pKa of X—H should be at least two units lower than that of the dominant component A C—H species. Component C can comprise more than one different component within the ranges specified.

Furthermore, it is important that X— is reactive with component B according to a Michael addition reaction, through the site where the acidic proton may be attached. Upon such reaction, the original X— anion is thus converted into a carbanion of higher basicity, with loss of the ability to reform an X—H species.

Finally, it is important that the reactivity of species X— towards component B is lower than that of the anion of the dominant C—H species of component A. This ensures that an effective induction time can be created. Preferably, the reactivity is lower by a factor of at least 3, more preferably 5, more preferably at least 10, even more preferably at least 20, even more preferably at least 40, most preferably at least 100. The reactivity however should also not be too low, since otherwise reaction completion will be too slow; the reaction should not be slower than that of the anion of component A by a factor more than 10,000, preferably not more than 5,000, more preferably not more than 2,000, even more preferably not more than 1,000, most preferably not more than 500.

Component C is present in an amount of at least 1 μeq/g (microequivalent per gram organic solid components), preferably more than 5 μeq/g, more preferably more than 10 μeq/g, and preferably not more than 1 meq/g, more preferably no more than 600 μeq/g, most preferably no more than 400 μeq/g. The term organic solid components refers to the solid resin forming components, also referred to as binder in a coating composition, excluding volatile components, pigments, sag control agents, and other paint typical paint additives. In particular, amounts are expressed in relation to the sum of components A, B, C, and optional D and F that react to form the crosslinked network. Component C is the dominant basic component present, eventually being able to initiate (following a cascade of acid-base reaction steps the reaction of component A and B. Preferably no significant amounts are present of other basic species being able to directly, or after unblocking a carbon dioxide, initiate the reaction between components A and B, without being consumed in a Michael addition reaction (and do not form a covalent bond) with component B. Component C can be an low molecular weight species, but it can also be part of a polymeric species, and it can be combined with component A and/or D in a polymer.

It is preferred that besides component C, also a component D is present to allow longer pot lives. For some applications, fast activation upon mixing may present no problems (or even be preferred), for others a longer workability window is required following mixing. Component D is an acidic component X'—H that is similar in characteristics to the corresponding acid X—H of the anion of component C. X' can be the same as X, or it can be different; component D can also comprise multiple species according to the definition. Thus, the pKa of component D is defined by being lower than 10.5 and being 2 units lower than pKa(A). Preferably, it is lower than 10, more preferable lower than 9.5, even more preferably lower than 9, most preferably lower than 8.5. Also if the dominant C—H species of component A is significantly lower than malonate (e.g. acetoacetate, pKa 10.7), the pKa of X'—H should be at least two units lower than that of the dominant component A. In general, the pKa of X'—H of component D will not be lower than that of the X—H species related to component C, since otherwise, an acid shift would reverse the roles of X and X' species, as will be recognized by those skilled in the art. X'—, upon deprotonation of component D, is reactive with component B according to a Michael addition reaction, through the site X' where the acidic proton is attached. Upon such reaction, the original X'-anion is thus converted into a D-B adduct carbanion of higher basicity, with loss of the ability to reform an X—H species.

The reactivity of species X'— towards component B is lower than that of the anion of the dominant C—H species of component A. This ensures that an effective induction time can be created. Preferably, it is lower by a factor of at least 3, more preferably 5, more preferably at least 10, even more preferably at least 20, even more preferably at least 40, most preferably at least 100. The reactivity however should also not be too low, since otherwise reaction completion will be too slow; the reactivity should not be lower than that of the anion of component A by a factor more than 10,000, preferably not more than 5,000, more preferably not more than 2,000, even more preferably not more than 1,000, most preferably not more than 500. The same reactivity preference applies to anion X— in component C.

Component C can be prepared by an acid-base reaction of a strong base and a component X—H. Component D (X'—H) can be separately added or, in case the anions X and X' or chosen the same, component D can also be formed in combination with component C by reacting a strong base with a molar excess of component D (X—H) to form a mixture of a salt of the anion of X—H as Component C and the remaining unreacted excess X—H as Component D. Evidently, it is possible to add an additional X'—H components D in which X' is not the same as the original X—H from which component C is formed. In such a combination, it is preferred in view of improving pot life that the total molar amount of the original X—H and X'—H species exceed that of the original strong base used.

Component D delays the cross-linking reaction between component A and B in the composition and creates an induction time. This also provides open time in application of a coating layer of the cross-linkable composition; open time being the time that the viscosity is low enough to flow and allow entrapped air to escape and solvent to evaporate. A large amount and low activity of component D provides a longer induction time/delay. The preferred equivalent amount of component D in the composition can be defined as a function of the equivalent amount of the anion X— in component C. The preferred molar ratio Rd/c of component D over basic anion X— in component C is dependent on the relative reactivity of the corresponding anion X— towards component B relative to anions of component A. The lower this relative reactivity of component C compared to A, the lower the preferred ratio can be to provide a good open time; if this relative reactivity is higher, the ratio will be higher. In general, we need at least 1 equivalent % of component D compared to component C, preferably more than 10%, more preferably more than 50%, even more preferably over 100%; preferably it is no more than 5000%, more preferably no more than 4000, 3000, 2000, 1000 or 500%.

As described above, components C and D can also be combined in one molecule. An example of such alternative embodiment is a molecule comprising a functional group containing more than one acidic X—H that is Michael Addition reactive with B, as would for example be the case for a 1,3-diketone, or nitromethane. A salt of such a material wherein one or more of the acidic X—H groups is in anion form, would be considered to contribute one or more equivalent of component C, but the other one or more not deprotonated X—H groups would provide one or more equivalents (for example nitromethane 2, and barbituric acid 3) of non-deprotonated X'—H species able to react with component B through Michael addition (component D). An example of such a molecule having both component C and D is a mono-salt of a compound of formula 1 wherein R=H. This salt has one acidic proton C—H as component D and one salt component C wherein X=X'. One equivalent of such a salt of a (mono-deprotonated) X—H would react with component B, followed by deprotonation of the second remaining acidic group (X'—H). This is analogous to a situation wherein C and D are separate and component C as a salt of a single X—H group reacts with Michael addition with B followed by deprotonation of an X'—H on another separate component D. A salt of acidic methylene or methyl groups containing multiple acidic hydrogens should be considered to contribute to both component C and D for example in a ratio 1:1 in case of methylene or ratio 1:2 in the case of nitromethane.

Component D can be present as low molecular weight species, it can be present as a polymer, it can be present in a molecule alongside the functionality of component C, as discussed in the previous paragraph, it can also be combined with component A in a polymeric substance, it can be combined with component B in as substance, and it can be part of a material in which the functionalities A, C and D are combined. It is possible that the composition contains less than 30 wt % to resin of other components able to undergo Michael addition reaction with component B not covered by the definitions of components A and D.

The pKa values referred to, are aqueous pKa values at ambient conditions (21° C.). They can be readily found in literature and if needed, determined in aqueous solution by procedures known to those skilled in the art. A list of pKa values of relevant components is given below.

| | | | |
|---|---|---|---|
| Succinimide | 9.5 | Isatine | 10.3 |
| Ethosuximide | 9.3 | Uracil | 9.9 |
| Phthalimide | 8.3 | 4-nitro-2-methylimidazole | 9.6 |
| 5,5-dimethyl hydantoin | 10.2 | Phenol | 10.0 |
| 1,2,4-triazole | 10.2 | Ethylacetoacetate | 10.7 |
| 1,2,3-triazole | 9.4 | ethyl cyano-acetate | 9.0 |
| benzotriazole | 8.2 | acetylacetone | 9.0 |
| benzene-sulfonamide | 10.1 | 1,3-cyclohexanedione | 5.3 |
| nitromethane | 10.2 | Saccharin | 2.0 |
| nitroethane | 8.6 | barbituric acid | 4.0 |
| 2-nitro-propane | 7.7 | diethylmalonate | 13.0 |

The relative reactivities in Michael addition of components A, C, D and F towards B and referred to can be determined experimentally. The reactivity of the anions of various X—H species can be derived from model experiments when either is tested under comparable conditions in a formulation at room temperature with excess of model RMA acceptor groups B (e.g. butylacrylate), and in presence of a base at least able to deprotonate 1 mole % of the RMA donor. The consumption of acidic species can be followed in time by titration, NMR, GC or other suitable analytical methods known to those skilled in the art.

Suitable components X—H (from which component C salts can be derived) and X'—H (components D) can be acids in which the acidic proton is attached to a C, N, P, O or S atom, and the Michael Addition reactivity takes place through these atoms. Preferably, it is attached to a C, N or P atom, most preferably a carbon or nitrogen atom. The X and X' in components C and D preferably are each independently chosen to be C, N or P.

Suitable compounds C and D have X— or X'—H originating from methine or methylene activated by two or three substituents, these substituents being selected from —CO2R ester groups, C(═O)R ketone groups, cyano groups and nitro groups, or a methyl, methylene or methine group activated by one nitro group. Examples of components that are suitable, as component D, or in their anion form, as part of component C, are cyanoacetates, 1,3-diketones as acetylacetone and 1,3-cyclohexanedione as well as their substituted analogs as dimedone, and nitroalkanes as nitromethane, nitroethane of 2-nitropropane. A preferred class of X—H and X'—H components C and D are compounds wherein the X from component C, and/or the X' in component D is a carbon-acidic compound (X=C); methine, methylene and methyl groups activated by electron withdrawing substituents as CO2R esters, ketones, cyano groups and nitro groups, in particular components according to formula 1. Usually, at least two of such substituents need to be present, although in the case of nitro groups, one substituent can suffice.

Another preferred class of X—H and X'—H components comprise compounds wherein the X from component C, and/or the X' in component D is an aza-acidic compound (X=N), preferably these N—H acidic compounds are derived from an Ar—NH—(C=O), —(C=O)—NH—(C=O)—, or a —NH—(O=S=O)— group or a heterocycle in which the nitrogen of the N—H group is contained in a heterocyclic ring. Preferred components can be found in the class of imide components, preferably (optionally substituted) cyclic imides, as succinimide and ethosuximide. Substituted hydantoins, uracils and barbiturates also fall in this category. Another suitable class is formed by aromatic sulphonamides, as benzenesulfonamide and p-toluenesulfonamid. Saccharine is a low pKa example in this category.

Another preferred class of X—H and X'—H components comprise N—H acidic compounds derived from heterocycles containing the N—H as part of the heterocyclic ring. Examples are triazoles, pyrazoles and imidazoles, e.g. 2-methyl-4-nitro-imidazole. Especially preferred are triazole components as 1,2,4-triazole and benzotriazole.

It was found that it can be beneficial in view of creating both a high reactivity in combination with a long pot life and open time if there are more than one different groups involved in the composition as X—H (related to component C) and X'—H (component D). The inventors have found that it is favourable to use a combination of one or more X—H or X'—H groups having a pKa<8.9 and other X—H or X'—H groups having a pKa>8.9; they have also found that it is favorable to combine a component from the aza-acidic compounds, in particular the triazoles, with imides or activated methylenes as 1,3-diketones. Preferably in the cross-linkable composition the pKa(C) is lower than 8.9 and pKa(D) is higher than 8.9.

Preferably in the crosslinkable composition
a. more than 50, preferably more than 60, 70 or even more preferably more than 80% of the RMA donor groups in components A are from malonate groups,
b. more than 50, preferably more than 60, 70 or even more preferably more than 80% of the RMA acceptor groups in components B are from acryloyl groups,
c. component C is a benzotriazolide salt, a salt of 1,2,4-triazole or a salt of 1,3-cyclohexanedione,
d. component D is benzotriazole or a triazole, a 1,3-diketone, or an imid.

The composition may further comprise as Component(s) E one or more thixotropy inducing additives, in particular sag control agents for use in coating applications and in particular in thick layers.

The crosslinkable composition may further comprise preferably minor amounts of component(s) F comprising an acidic X"—H group wherein X" is N, P, O, S or C, which is i) different from components A and D but also a Michael addition donor reactable with component B. These components could for example be components with the same pKa range as components A but that do not have at least 2 reactive groups for forming a crosslinked network, components C or N—H acidic component(s) having a pKa above 10.5, for example pyrazoles and imidazoles. Such component may be used to moderate reactivity of component A to improve open time. The amount xf of component(s) F is at most 30 wt %, more preferably at most 25, 20, 15 and preferably between 1-10 or 1-5 wt % relative to the total weight of resin forming components A, B, C, D and F.

The cross-linkable composition as described above will generally not be commercially available because the pot life is generally too short; the time in which the composition can be handled before viscosity increase or gelation make this impossible is too short. Therefore, the crosslinkable composition needs to be completed by mixing the constituent components A to F shortly before application. The invention therefore also relates to kits of parts wherein the parts comprise combinations of the constituent components of the crosslinkable composition that do not react.

In particular the kit of parts for the manufacture of the composition according to the invention comprises 1) a part I.1, comprising component(s) C and a part II.1 not comprising component(s) C or alternatively 2) a kit of parts comprising a part I.2 comprising component B and a part II.2 not comprising component B or alternatively 3) a kit of parts comprising part I.3 comprising instead of component C the corresponding acidic compound X—H and a part II.3 comprising a strong base for mixing with part I.3 to convert the acidic compound X—H to its corresponding salt component C.

The inventors have found that a preferred way of combining the components of the cross-linkable composition, is to provide one part I.1 comprising component C, preferably in a part of the solvent if needed and preferably also at least part of component D and a separate part II.1 not comprising components C and comprising components A, B and optionally D and F. The invention also relates to a kit of parts I.1 and II.1 as described. The invention also relates to a method of forming the crosslinkable composition by adding kit part I.1 containing component C to a composition containing component A or B.

An alternative way of combining the components to form the complete crosslinkable composition is by having a part I.2 in which component A and component C (and optionally component D) are combined but not component B and a part II.2 and comprising component B, which parts II.1 and II.2 can be combined shortly before use. The invention also relates to a kit of parts II.1 and II.2 as described and to a method for the preparation of the cross-linkable composition comprising the mixing of parts II.1 and II.2.

A third useful way or preparing the crosslinkable composition, is by providing a composition comprising components A, B and optionally D and F, and instead of adding component C as salt, adding the corresponding acid component X—H followed (shortly before application) by the addition of a strong base which forms the component C salt in situ. The same can be achieved if X—H is added in molar excess to the strong base leaving residual X—H as component D. This method requires proper mixing routines, for example dilution of the strong base and/or intense stirring/mixing, so that salt formation can occur before unintended (local) initiation of the RMA reaction of components A and B. This component X—H can also be added shortly before the application of the cross-linkable composition. Optionally the salt component C is formed ex-situ shortly before application by reacting the component X—H with a strong base and adding to the remaining components of the crosslinkable composition. The invention therefore also relates to a part I.3 comprising components A, B and optionally D and F, and instead of component C as salt the corresponding acid component X—H. The invention also relates to its use for the preparation of a cross-linkable composition according to the invention, to a kit of part comprising part I.3 and a separate part II.3 comprising a strong base and to the process comprising mixing of part I.3 and II.3. The invention also relates to compositions obtained by the processes mixing of components A to C and optionally D, E and F in any particular order, preferably in an order as above described. The invention also relates to a method of preparing a crosslinkable composition comprising providing a first composition comprising components A, B, optional D and F but not component C and, just before use of the crosslinkable composition, forming component C by reacting a strong base with an X—H containing component either in-situ in the first composition or ex-situ followed by mixing of the thus formed component C with the first composition.

It is noted that in the composition pK(D) is higher than pK(C). However, when component C and D are separate in a kit of parts, this is not required because on mixing an acid-base reaction will take place between X'—H (D) and X(—) (C) and in equilibrium there will be X—H and X'(—) in the crosslinkable composition.

The crosslinkable composition according to the invention can have a gel time at room temperature of more than 20 minutes. For many applications, upon completing preparation of the crosslinkable composition, the resulting composition has preferably a gel time, before application, at room temperature of more than 20 minutes, more preferably more than 30 minutes, more preferably more than 60 minutes, most preferably more than 90 minutes. A method for measuring the gel time is described below. The crosslinkable composition can be cured at various temperatures, and it is also possible and advantageous to do so at low temperatures which are usually the most challenging. The composition can be cured at temperatures less than 120, preferably less than 100, 80, 60, 50, 40 and even less than 30° C.

The cross-linkable composition according to the invention comprises network forming components A, B, C, preferably also D and optionally F and optionally comprising solvent, said composition preferably having
 a. Component(s) A, preferably an oligomer or polymer, in an amount xa between 5 and 95 wt % relative to total resin and
 b. component(s) B, preferably a dimer, trimer or tetramer, oligomer or polymer, in an amount xb between 5 and 95 wt % relative to total resin, wherein xa plus xb is at least 40, preferably 50, 60, 70, 80 or 90 wt % relative to total resin,
 c. basic component(s) C in an amount xc between 0.001 and 1 meq/(gr total resin),
 d. preferably component(s) D in an amount xd such that the equivalent ratio Rd/c of acidic X'—H groups in component D over basic anion groups X— in component C is between 1% and 5000%,
 e. optional component(s) F in an amount xf between 1 and 30 wt % to relative to total resin,
 f. optionally a solvent in an amount between 0.1 and 80 wt % relative to total weight of total resin plus solvent.

Depending on the envisaged application, the crosslinkable composition may also contain a certain amount of one or more different solvents, preferably organic solvents. In coating applications it may be preferred to add organic solvents, preferably less than 80 wt %, more preferably less than 55, 45, 35, 25 wt %. In view of creating a better pot life it is preferred that the solvent comprises at least 1 wt % of volatile primary alcohols, more preferably at least 3 wt %, even more preferably at least 5 wt %, most preferably at least 8 wt %, volatile primary alcohols (relative to total weight of ABCD and F and solvent). The boiling point of the volatile primary alcohols is preferable less than 140° C., more preferably less than 130, 120, 110 and most preferably less than 100° C. Examples include methanol, ethanol, n-propanol, n-butanol, n-pentanol. The crosslinkable composition can also contain water.

The invention makes possible to provide substantially solvent free crosslinkable compositions for special applications. Such special embodiments are for example powder coat resins or resin for composite materials. Because the molecular weight of the components A, B, C, D and F can be chosen very low, the viscosity of the composition can be low enough for applications requiring a low viscosity even without a solvent. Low molecular weight components A to F (Mw<500, 400, 300 or 200) can be used reactive diluent. For example mono-acetoacetate or mono-malonate can be used as reactive diluent components A. The advantage is that the composition has a very low content of volatile organic components (VOC) which presents a significant environmental advantage. Therefore, in one of the preferred embodiments the amount of added organic solvent is low and the VOC is less than 5, more preferably less than 3, 2 or even 1 wt %. In this embodiment, it is preferred that the resin components A, B, C, D or F have a molecular weight Mw lower than 50,000, 20,000, 10,000, 5000 or even lower than 3000 gr/mol. This composition can advantageously be used in applications in which VOC evaporation is impossible or difficult or unacceptable.

The components A, B, C, D and F all react with each other and become integrated into the cross-linked network. As described above components A and B have at least two cross-linked functional groups (the RMA donor and acceptor groups respectively) to form the cross-linked network. Preferably at least one of components A or B have average more than 2, preferably at least 2.1 cross-link functional groups to provide a more densely cross-linked network. Apart from components A and B, also each of components C, D and F may comprise two or more RMA donor groups so they become fully integrated in the cross-linked network. In general the total amount of components that have two or more cross-linking groups and hence can become fully integrated in the cross-linked network represents at least 40, more preferably at least 50, 60 and 70 and most preferably at least 80 wt % of the total weight of components A, B, C, D and F. However, it is preferred that components A and B form the majority of the cross-linked network, preferably at least 50, 60 or 70 and most preferably at least 80 wt % of the total weight of resin components A, B, C, D and F.

Moreover, the crosslinkable composition may contain other components relevant to the specific application intended. These can be rheology additives to induce thixotropy to allow vertical application of coatings without sagging; the cross-linkable composition for use as coating composition can include all sorts of coating additives like pigments, extenders, nanoparticles, fibers, stabilizers, dispersants, wetting additives, defoaming additives, blowing agents etc.

The crosslinkable composition according to the invention can be used as coating compositions, for coatings in the field of e.g. metal or wood coatings, plastic coatings, automotive coatings, marine and protective applications, either pigmented or as clear coat. It can also be useful for applications in the field of inks, films, adhesives, foams and composites (as composite matrix). The invention therefore also relates to coating compositions comprising the crosslinkable composition according to the invention and further paint additives, preferably a thixotropy control agent and to composite articles comprising a filler material, preferably fibers or particles, more preferably inorganic fibers or particles and as a binder material the crosslinked composition according to the invention.

The foregoing more general discussion of the present invention will be further illustrated by the following specific examples, which are exemplary only.

The following abbreviations were used for chemicals used in the experiments: DiTMPTA is di-trimethylolpropane-tetraacrylate (obtained from Aldrich (MW=466 g/mol)) or used as Sartomer SR355 (supplied commercially by Sartomer); Disperbyk 163 is a dispersant commercially supplied by Byk; Byk 310 and 315 are additives commercially supplied by ByK; Kronos 2310 is a TiO2 pigment commercially supplied by Kronos, TBAH is tetrabutylammonium hydroxide, TPAH is tetrapropylammonium hydroxide, DBU is 1,8,-diazabicyclo[5.4.0]undec-[7]-ene, CHD is 1,3-cyclohexanedione, EtAcAc is ethyl acetoacetate; RT is room temperature, BT is Benzotriazole, KBZT solution is solution of potassium benzotriazolide in ethanol as described below.

Preparation of Malonate Polyester A

Into a reactor provided with a distilling column filed with Raschig rings were brought 17.31 mol of neopentyl glycol, 8.03 mol of hexahydrophthalic anhydride and 0.0047 mol of butyl stannoic acid. The mixture was polymerised at 240° C. under nitrogen to an acid value of 0.2 mg KOH/g. The mixture was cooled down to 130° C. and 10.44 mol of diethylmalonate was added. The reaction mixture was heated to 170° C. and ethanol was removed under reduced pressure. The nearly colourless material was cooled down and diluted with 420 g of butyl acetate to a 90% solid content. The final resin had an acid value of 0.3 mg KOH/g solids, an OH value of 20 mg KOH/g solids and a weight average molecular weight of 3400 Da.

Preparation of Base Solution C

An amount of acid (X—H) was dissolved in a solution of strong base in an alcoholic solvent according to Table A (amounts in gram; all molar ratios strong base/acid are equal to 1). The solution was left overnight before use.

TABLE A

| Base code | Type strong base | Amount strong base | Type acid | Amount acid | Ethanol |
|---|---|---|---|---|---|
| C1 | KOH | 7 | Benzotriazole | 14.86 | 63 |
| C2 | TBAH 40% in MeOH | 5 | Benzotriazole | 0.92 | 0 |
| C3 | KOH | 1 | 1,2,4-triazole | 1.23 | 9 |
| C4 | DBU | 0.50 | Benzotriazole | 0.39 | 2 |
| C5 | TPAH 40% in water | 1 | Benzotriazole | 0.23 | 0 |
| C6 | KOH | 0.86 | CHD | 1.72 | 8 |
| C7 | tributylamine | 1 | Benzotriazole | 0.64 | 4 |

The foregoing more general discussion of the present invention will be further illustrated by the following specific examples, which are exemplary only.

Molecular weights were measured by GPC in THF, and expressed in polystyrene equivalent weights.

Gel time determination: After mixing the base C with the cross-linkable formulation, the formulation was checked visually at regular intervals for viscosity increase and heat development. The gel time was defined as the time needed to stop 10 g of cross-linkable formulation in a 40 ml vial from displaying any movement when the vial was turned upside down.

Drying time determination: Paint was sprayed on a 19×10.5 cm phosphate pre-treated steal panel using a Devilbiss spraygun, nozzle FF-1.4 with an air pressure of 3.5 bar giving a dry film layer thickness between 67 and 91 µm. Directly after spraying, the paint was checked regularly (typically every 2-5 min) manually for tackiness under climatised conditions (22° C., 60±2% relative humidity). When the film did not display any tackiness any more upon manual touching, the film was checked for skin-formation and through-drying by touching with greater force and rotation. If no mark was observed after this determination, the paint was defined as dry and the drying time was recorded.

Persoz hardness measurement: Persoz pendulum hardness was measured in a climatized room at 23° C., and 55+/−5% relative humidity. Hardness is measured with a pendulum acc. Persoz as described in ASTM D 4366. Layer thicknesses were measured with a Fischer Permascope MP40E-S in fivefold on different places on the panel and averaged.

Wavescan analysis: The panels as described above were analyzed using the Wavescan II of Byk instruments. Data were stored using Autochart software from Byk. Analysis was done in the direction perpendicular to the thickness gradient. In this instrument the light of small laser diode is reflected by the surface of the sample under an angle of 60°, and the reflected light is detected at the gloss angle (60° opposite). During the measurement, the "wave-scan" is moved across the sample surface over a scan length of approx. 10 cm, with a data point being recorded every 0.027 mm. The surface structure of the sample modulates the light of the laser diode. The signal is divided into 5 wavelength ranges in the range of 0.1-30 mm and processed by mathematical filtering. For each of the 5 ranges a characteristic value (Wa 0.1-0.3 mm, Wb 0.3-1.0 mm, Wc 1.0-3.0 mm, Wd 3.0-10 mm, We 10-30 mm) as well as the typical wave-scan-values longwave (LW, approx. 1-10 mm) and short-wave (SW, approx. 0.3-1 mm) is calculated. Low values mean a smooth surface structure. Additionally a LED light source is installed in the wave-scan DOI and illuminates the surface under 20 degrees after passing an aperture. The scattered light is detected and a so-called dullness value (du, <0.1 mm) is measured. By using the three values of the short wave range Wa, Wb and du a DOI value is calculated. (see Osterhold e.a., Progress in Organic Coatings, 2009, vol. 65, no 4, pp. 440-443).

TABLE B

| Code | Ex 1 | Ex 2 | Ex 3 | Ex 4 | Ex 5 | Ex 6 |
|---|---|---|---|---|---|---|
| Malonate polyester resin (A) | 10 | 10 | 10 | 10 | 10 | 10 |
| Sartomer SR355 (B) | 5.81 | 6.46 | 5.81 | 6.46 | 7.02 | 7.02 |
| EtAcAc (A) | 0 | 0.35 | 0 | 0.35 | 0.35 | 0.35 |
| Benzotriazole (D) | 0 | 0 | 0 | 0 | 0.57 | 0 |
| 1,2,4-triazole (D) | 0 | 0 | 0 | 0 | 0 | 0.33 |
| Base-solution type (C) | C1 | C1 | C3 | C3 | C1 | C3 |
| Base solution amount (C) | 2.93 | 3.26 | 2.72 | 2.72 | 3.26 | 3.02 |
| Gel time (min) | 3 | 5 | 3 | 3 | 28 | 9 |

Cross-linkable formulations were prepared according to Table B (amounts in gram). Components A, B and D were added and mixed. Subsequently, base-solution C was added and the formulation was mixed again. The gel time was recorded as described above and the results are included in Table B.

The gel times in the Table clearly demonstrate very fast gelation was observed when malonate polyester and Sartomer SR355 were mixed only with base component C (Ex 1, 3). It was also noted that the reaction was highly exothermic. Also, when EtAcAc was added, gelation was very fast, despite the somewhat lower functionality (Ex 2, 4). Interestingly, when an excess of component D was added (Ex 5, 6), a significant delay of the gelation was observed. The delay was larger when component D was benzotriazol compared to when component D was 1,2,4-triazol, most likely because of the lower reactivity of benzotriazolide as Michael donor.

TABLE C

| Code | Ex 7 | Ex 8 | Ex 9 | Ex 10 | Ex 11 | Comp 1 |
|---|---|---|---|---|---|---|
| Malonate polyester resin (A) | 10 | 10 | 10 | 10 | 10 | 10 |
| Sartomer SR355 (B) | 6.46 | 7.02 | 7.02 | 6.0 | 6.0 | 6.0 |
| EtAcAc (A) | 0.35 | 0.35 | 0 | 0 | 0 | 0 |
| Benzotriazole (D) | 0 | 0.57 | 0.57 | 0.18 | 0 | 0 |
| Base-solution type (C) | C2 | C2 | C5 | C4 | C6 | C7 |
| Base solution amount (C) | 3.68 | 3.68 | 2.99 | 2.89 | 3.31 | 4.54 |
| Gel time (min) | 4 | 28 | 35 | 37 | ±750 | No gel |

Cross-linkable formulations from Table C were prepared and tested in a similar way compared to the formulations in Table B. Comparison of examples Ex 7-9 show that salts with other cations neutral in the RMA reaction can be used as initiators to achieve gelation of these formulations. Again, addition of an excess of component D (benzotriazole) resulted in longer gelation times.

The salt of nitrogen base DBU and benzotriazole resulted in a similar observation (Ex 10), i.e. gelation occurred in a similar time as observed for other samples containing component D. Interestingly, if a weaker nitrogen base was used, such as tributylamine, no gelation was observed (Comp 1). This could be explained by the higher acidity of the tributylammonium cation compared to DBU-H+, i.e. the first significantly inhibited deprotonation of malonates, whereas the latter did not.

A special case is the use of 1,3-cyclohexanedione (Ex 11), because this compound has two acidic CH bonds. In its form as mono-potassium salt, one acidic and potentially RMA reactive CH bond will still be present. Therefore, it will act both as component C and as component D. This compound could also be used to initiate gelation of this cross-linkable composition. However, because of its low pKa-value and potential low reactivity in RMA reactions, a long gelation time was found.

TABLE E

| | | | | | | |
|---|---|---|---|---|---|---|
| Dry layer thickness (μm) | 90 | 91 | 85 | 87 | 67 | 69 |
| Drying time (min) | 37 | 46 | 50 | 65 | 45 | 60 |
| Gel time (min) | 30 | 42 | 55 | 72 | 60 | n.d. |
| Hardness after 24 h RT | 116 | 109 | 115 | 68 | 138 | 109 |
| Shortwave | 6.7 | 4.6 | 5.0 | 4.0 | 7.8 | 31.7 |
| Longwave | 2.5 | 3.2 | 3.7 | 2.4 | 4.8 | 4.7 |

Example formulations Ex 12-17 were prepared as pigmented paints, having compositions as tabulated in Table X (amounts in grams).

The pigmented paint was prepared by first milling Kronos 2310, Disperbyk 163 and Sartomer SR355 together to a pigment paste (first 3 components from table D). The KBZT solution was obtained by dissolving 7 g of KOH and 14.86 g of benzotriazole (1:1 molar ratio) in 63 g of ethanol, yielding a 1.47 meq/g solution of potassium benzotriazolide. To the pigment paste, malonate resin, more Sartomer SR355, EtAcAc, Byk 310/315 mix, Benzotriazole, acetyl acetone, n-propanol and butyl acetate were added in amounts according to Table D. All components were mixed. Subsequently, the KBZT solution was added, the now ready-to-spray paint was mixed and sprayed as described above within 5 minutes after addition of the KBZT solution.

Dry layer thickness (μm), drying time (min), gel time (min), hardness after 24 h RT, shortwave and longwave were measured on these formulations as described above. Results are included in Table E.

It can be observed from comparison of examples Ex 12, 13, 14 that increasing the amount of acetyl acetone in the formulations resulted in increased drying times as well as longer gel times, without affecting the hardness too much. Comparison of Ex 14 and Ex 15 demonstrates that increasing the level of benzotriazole further delayed the drying and gel time. However, when a very similar formulation (Ex 16), containing less KBZT solution compared to Ex 15, was applied at a lower layer thickness, good results were obtained with respect to drying time, drying/gel time balance and hardness. Finally, Ex 17 shows that succinimide is very effective in extending the drying time, but this resulted in a high shortwave value.

EXAMPLE 18. DETERMINATION OF MICHAEL ADDITION REACTIVITY OF SUCCINIMIDE 5 grams of succinimide (50.5 mmole) were dissolved in a mixture of 42 grams of butyl acrylate and 42 grams of methanol, and maintained at room temperature as such, or after adding a strong base (9.82 grams of a 1.12 meq/g

TABLE D

| Code | Ex 12 | Ex 13 | Ex 14 | Ex 15 | Ex 16 | Ex 17 |
|---|---|---|---|---|---|---|
| Kronos 2310 | 125.28 | 125.28 | 125.28 | 127.71 | 126.92 | 125.28 |
| Disperbyk 163 | 3.77 | 3.77 | 3.77 | 3.84 | 3.82 | 3.77 |
| Sartomer SR355 (B) | 59.62 | 59.62 | 59.62 | 60.77 | 60.40 | 59.62 |
| Malonate polyester resin (A) | 100 | 100 | 100 | 100 | 100 | 100 |
| Sartomer SR355 (B) | 8.51 | 8.51 | 8.51 | 10.4 | 9.8 | 8.51 |
| EtAcAc (A) | 3.47 | 3.47 | 3.47 | 3.47 | 3.47 | 0 |
| Byk 310/315 (1:4 by mass) | 0.94 | 0.94 | 0.94 | 0.96 | 0.95 | 0.92 |
| Benzotriazole (D) | 3.11 | 3.11 | 3.11 | 6.22 | 5.71 | 0.87 |
| Acetyl acetone (D) | 0 | 5.23 | 10.45 | 10.45 | 9.6 | 0 |
| Succinimide (D) | 0 | 0 | 0 | 0 | 0 | 0.31 |
| n-Propanol | 27.5 | 27.9 | 26.3 | 26.95 | 26.5 | 14.69 |
| Ethanol | 0 | 0 | 0 | 0 | 0 | 13.50 |
| Butyl acetate | 27.5 | 27.9 | 26.3 | 26.95 | 26.5 | 0 |
| KBZT solution (C) | 35.5 | 35.5 | 35.5 | 35.5 | 32.6 | 17.71 | solution of tetrabutylammonium hydroxide in methanol, 11 meq). Subsequently, the concentration of succinimide is determined as a function of time by taking samples, neutralizing with a known excess of HCl in water, and backtitration with a KOH solution. Without base initiation, no significant loss of succinimide N—H in this solution is observed in two weeks. With the base added, the succinimide concentration can be seen to decrease with time, as illustrated in Table F below. Succinimide concentration is expressed as % relative to the theoretical level based on used amounts.

TABLE F

| Time (min) | Succinimide remaining (%) |
|---|---|
| 3 | 99 |
| 30 | 87 |
| 60 | 77 |
| 120 | 60 |
| 180 | 48 |

At this catalyst level ([succinimide]/[base]=5), 23% of the succinimide acidic protons were consumed in approx. 1 hour.

Using the same method, also the reactivity for various other components was determined; as a reference a similar set-up was used for the reactivity of dimethylmalonate under these conditions (only in this case, the remaining DMM level was determined with GC). Table G lists the results of the relative Michael addition reactivities, expressed as a number indicating the initial increase in % conversion, per minute, under these conditions. It can be seen that in all cases, this intrinsic reactivity is significantly lower than that of a malonate, but still present.

TABLE G

| Relative conversion rates | |
|---|---|
| Dimethylmalonate | 42 |
| Succinimide | 0.33 |
| Benzotriazole | 0.29 |
| 1,2,4 triazole | 0.91 |
| 5,5-dimethylhydantoin | 0.03 |
| Benzenesulfonamide | 0.11 |

What is claimed is:

1. A crosslinkable composition crosslinkable by Real Michael Addition (RMA) reaction comprising:
   a) Component(s) A having at least 2 acidic C—H donor groups in activated methylene or methine and having a pKa(A) between 10.5 and 14,
   b) Component(s) B having at least 2 activated unsaturated acceptor groups, wherein a molar ratio R of acceptor groups to donor groups is between 3:1 to 1:6 and which component(s) B react with component(s) A by Real Michael Addition (RMA) to form a crosslinked network,
   c) basic component(s) C being a salt of a basic anion X— from an acidic X—H group containing compound wherein X is N, P, O, S or C,
      i) in an amount xc between 0.001 and 1 meq/(gr of components A, B, C, D),
      ii) anion X— being a Michael Addition donor reactable with component B and
      iii) anion X— is characterized by a pKa(C) of the corresponding acid X—H of more than two units lower than the pKa(A) of the majority component A and being lower than 10.5,
   d) not including a composition comprising an ethylmalonate modified polyester based on neopentyl glycol and hexahydrophthalic anhydride, di-trimethylolpropane-tetraacrylate and tetrabutylammonium succinimide and ethylacetoacetate.

2. The crosslinkable composition according to claim 1 comprising:
   component(s) D comprising one or more acidic X'—H groups wherein X' is N, P, O, S or C,
      i) X' being a same or different group as group X in component C,
      ii) the X'-anion being a Michael Addition donor reactable with component B,
      iii) the pKa(D) of the X'—H group in component D being more than two units lower than the pKa(A) of the majority component A and being lower than 10.5,
      iv) the equivalent ratio Rd/c of acidic X'—H groups in component D over basic anion X— in component C is between 1 and 5000%.

3. The crosslinkable composition according to claim 2, wherein pKa(D) is equal to or higher than pKa(C).

4. The crosslinkable composition according to claim 2, further comprising component(s) F comprising an acidic X"—H group wherein X" is N, P, O, S or C
   i) different from components A and D,
   ii) F being a Michael addition donor reactable with component B.

5. The crosslinkable composition according to claim 1, wherein the composition comprises less than 50 mole % relative to basic components C of other basic compound other than C that can initiate or catalyse the RMA crosslinking reaction.

6. The crosslinkable composition according to claim 2, comprising:
   a) Component(s) A in an amount xa between 5 and 95 wt % and
   b) Component(s) B in an amount xb between 5 and 95 wt %, wherein xa plus xb is at least 40 wt %,
   c) basic component(s) C in an amount xc between 0.001 and 1 meq/(gr total resin),
   d) component(s) D in an amount xd such that the equivalent ratio Rd/c of acidic X'—H groups in component D over basic anion groups X— in component C is between 0% and 5000%,
   e) component(s) F in an amount xf between 0 and 30 wt %,
   wherein wt % is relative to total resin forming components A, B, C, D and F.

7. The crosslinkable composition according to claim 1 wherein at least 50 mole % of the RMA donor groups in component(s) A are from malonate or acetoacetate groups.

8. The crosslinkable composition according to claim 1, in which the RMA acceptor components B are acryloyl or maleate groups or mixtures thereof.

9. The crosslinkable composition according to claim 2, in which anions X— and X'— in components C and D have a lower Michael Addition reactivity towards component B than an anion of the majority component A by a factor of at least 3, but no more than 10,000.

10. The crosslinkable composition according to claim 2, wherein
   a) more than 50 mole % of RMA donor groups in components A are from malonate groups,
   b) more than 50 mole % of the RMA acceptor groups in component B are from acryloyl groups, c) component C is a benzotriazolide salt, a salt of 1,2,4-triazole or a salt of 1,3-cyclohexanedione, d) component D is benzotriazole or a triazole, a 1,3-diketone, or an imid.

11. The crosslinkable composition according to claim 1, wherein the composition comprises a solvent and wherein the amount of solvent is not higher than 55 wt %.

12. The crosslinkable composition according to claim 2, wherein the anion X— in component C, and/or the X' group in component D is an aza-acidic compound.

13. The crosslinkable composition according to claim 2, wherein the anion X— from component C, and/or the X' group in component D is a carbon-acidic compound.

14. The crosslinkable composition according to claim 2, wherein the anion X— in component C, and/or the X' group in component D are derived from an aromatic sulfonamide.

15. The crosslinkable composition according to claim 2, wherein component C is a triazole and component D an imid or a 1,3 diketone.

16. A crosslinkable composition crosslinkable by Real Michael Addition (RMA) reaction comprising:
   a) Component(s) A having at least 2 acidic C—H donor groups in activated methylene or methine and having a pKa(A) between 10.5 and 14,
   b) Component(s) B having at least 2 activated unsaturated acceptor groups, wherein a molar ratio R of acceptor groups to donor groups is between 3:1 to 1:6 and which component(s) B react with component(s) A by Real Michael Addition (RMA) to form a crosslinked network,
   c) basic component(s) C being a salt of a basic anion X— from an acidic X—H group containing compound wherein X is N, P, O, S or C,
      iv) in an amount xc between 0.001 and 1 meq/(gr of components A, B, C, D),
      v) anion X— being a Michael Addition donor reactable with component B and
      vi) anion X— is characterized by a pKa(C) of the corresponding acid X—H of more than two units lower than the pKa(A) of the majority component A and being lower than 10.5,
   d) component(s) D comprising one or more acidic X'—H groups wherein X' is N, P, O, S or C,
      i) X' being a same or different group as group X in component C,
      ii) the X'-anion being a Michael Addition donor reactable with component B,
      iii) the pKa(D) of the X'—H group in component D being more than two units lower than pKa(A) of the majority component A and being lower than 10.5,
      iv) the equivalent ratio Rd/c of acidic X'—H groups in component D over basic anion X— in component C is between 1 and 5000%.

17. The crosslinkable composition according to claim 16, wherein pKa(D) is equal to or higher than pKa(C).

18. The crosslinkable composition according to claim 16, wherein the composition comprises less than 50 mole % relative to basic components C of other basic compound other than C that can initiate or catalyze the RMA crosslinking reaction.

19. The crosslinkable composition according to claim 16, comprising:
   a) Component(s) A in an amount xa between 5 and 95 wt % and
   b) Component(s) B in an amount xb between 5 and 95 wt %, wherein xa plus xb is at least 40 wt %,
   c) basic component(s) C in an amount xc between 0.001 and 1 meq/(gr total resin),
   d) component(s) D in an amount xd such that the equivalent ratio Rd/c of acidic X'—H groups in component D over basic anion groups X— in component C is between 0% and 5000%,
   e) component(s) F in an amount xf between 0 and 30 wt %, wherein wt % is relative to total resin forming components A, B, C, D and F.

20. The crosslinkable composition according to claim 16, wherein at least 50 mole % of the RMA donor groups in component(s) A are from malonate or acetoacetate groups and the RMA acceptor components B are acryloyl or maleate groups or mixtures thereof.

21. The crosslinkable composition according to claim 16, in which anions X— and X'— in components C and D have a lower Michael Addition reactivity towards component B than an anion of the majority component A by a factor of at least 3, but no more than 10,000.

22. The crosslinkable composition according to claim 16, wherein the anion X— in component C, and/or the X' group in component D is an aza-acidic compound.

23. The crosslinkable composition according to claim 12, wherein the aza-acidic compound comprises a molecule containing the N—H as part of a group Ar—NH—(C=O), —(C=O)—NH—(C=O)—, or a —NH—(O=S=O)— group, or a heterocycle in which the nitrogen of the N—H group is contained in a heterocyclic ring.

* * * * *